July 1, 1969    R. H. BEGEMAN ETAL    3,453,617
SWITCHABLE LINEAR-CIRCULAR POLARIZED MONOPULSE RADAR FEED
PRODUCING TWO AXIS (THREE-DIMENSIONAL TRACKING)
INFORMATION UTILIZING A TWO-LOBE
MONOPULSE DESIGN Filed July 14, 1964    Sheet 1 of 2

INVENTORS.
ROBERT H. BEGEMAN
ORVILLE G. BRICKEY
CHARLES W. MAY
RICHARD E. McCORMICK
BY
ATT'YS.

INVENTORS.
ROBERT H. BEGEMAN
ORVILLE G. BRICKEY
CHARLES W. MAY
RICHARD E. McCORMICK
BY
H. H. Losche ATT'YS.

United States Patent Office 3,453,617
Patented July 1, 1969

---

3,453,617
SWITCHABLE LINEAR-CIRCULAR POLARIZED MONOPULSE RADAR FEED PRODUCING TWO AXIS (THREE-DIMENSIONAL TRACKING) INFORMATION UTILIZING A TWO-LOBE MONOPULSE DESIGN
Robert H. Begeman and Orville G. Brickey, Indianapolis, Charles W. May, Martinsville, and Richard E. McCormick, Beech Grove, Ind., assignors to the United States of America as represented by the Secretary of the Navy
Filed July 14, 1964, Ser. No. 384,029
Int. Cl. G01s 9/22, 3/72; H01q 19/12
U.S. Cl. 343—7.4   18 Claims The invention described herein may be manufactured and used by or for the Government of the United States of America for governmental purposes without the payment of any royalties thereon or therefor.

This invention relates to radar systems and more particularly to a tracking radar having a circularly polarized, two-lobe monopulse antenna feed to produce two-axis tracking from a single-axis radar. It is understood that range tracking is still possible, therefore full three-dimensional tracking (azimuth, elevation, and range) is provided with this system. Another salient feature of this system is the clutter rejection of the circular polarized mode of operation.

Earlier tracking radars were improved in resolution by raising the transmitter frequencies, but along with this improvement came the disadvantage of receiving precipitation clutter. Circularly polarized electromagnetic energy appears to be the most promising technique to reject clutter caused by raindrops. Radars are now in use which are capable of producing selectively either linear or circular polarization of the electromagnetic energy. The circular polarization technique is based on the assumption that raindrops are symmetrical and objects of desired detection are asymmetrical. In these systems circularly polarized energy of one sense of rotation is transmitted and the energy reflected by symmetrical raindrops will reverse the sense of rotation and these returns will be rejected by the circularly polarized antenna; thus, the rain clutter will be rejected but the energy return from all asymmetrical objects will be accepted. The components of the circularly polarized waves having the same sense of rotation as the incident or transmitted wave will be accepted by the radar antenna while other components will be rejected. In these radar system circularly polarized pulse, pulse Doppler, Doppler, or continuous wave energy is used which will provide precipitation clutter rejection.

In such systems either a cluster of four feeds or essentially two radar systems with two sets of antennas are required for tracking in both azimuth and elevation.

In the present invention a two-lobe monopulse antenna feed is used to obtain two-axis elevation and azimuth range tracking information, the same as obtained from a four-lobe antenna feed. The antenna feed consists of a folded-tee or comparator and a circularly polarizing component which may be used to switch from linear polarization to right or left circular polarization as the situation requires. A linearly polarized electromagnetic wave is one in which the electric field vector points in one direction only, usually vertically or horizontally. A circularly polarized wave is defined as electromagnetic energy whose electric field is constant in amplitude and rotates as the signal propagates through space. The locus of the electric field is a circle which may be set out mathematically as:

$$E_V^2 + E_H^2 = E^2 \qquad (1)$$

where

E=magnitude of electric field
$E_H$=instantaneous horizontal component of electric field
$E_V$=instantaneous vertical component of electric field In rectangular co-ordinates the instantaneous value of $E_V$ and $E_H$ may be expressed as:

$$E_V = E \cos wt \qquad (2)$$
$$E_H = E \sin wt$$
$$= E \cos (wt + 90) \qquad (3)$$

The Equations 2 and 3 establish the basic requirements for a circular polarized wave. They are two signals of equal amplitude and separated by 90°.

The circularly polarized waves are produced for transmission by conducting linearly polarized energy of the rectangular waveguide $TE_{10}$ mode from the sum channel of the transmitter through a folded-tee or microwave comparator section to a circular waveguide to convert the energy to the circular waveguide $TE_{11}$ mode. The circular waveguide is rotatable on the folded-tee and has two rods placed diametrically across the guide in the same plane and spaced ⅜ wavelength apart to produce a 90° differential phase shift when the electric fields are parallel to the rods. The means of producing circularly polarized energy from linearly polarized energy by the use of two rods ⅜ wavelength apart in a circular waveguide is more fully shown and described in the text Principles and Applications of Waveguide Transmission by George Southworth, Third Printing, 1956, Van Nostrand Company, Incorporated Section 9.4 on "Methods of Varying Phase." While a particular differential phase shifting means is shown and described herein, it is to be understood that other known differential phase shifters could be used with equal facility, the invention not being in any way limited to a particular differential phase shifter. It is well known that circularly polarized radar systems will cause cancellation of precipitation clutter in the receiver condition since the sense of polarization is reversed; that is, if right-hand circular polarization is transmitted, spherical raindrops reflect the energy as left-hand circular polarization and the left-hand circular polarization will not be accepted through the antenna, as set forth in the text Introduction to Radar Systems by Skolnik (1962), McGraw-Hill Book Company, Section 12.7; however, the transmission of linearly polarized monopulse radar signals through a folded-tee section and a circular polarizer and the reception of echo and precipitation clutter signals back through the circular polarizer and folded-tee section provides two-axis target information and a certain amount of precipitation clutter rejection under the concept of this invention. It is therefore a general object of this invention to provide a circular polarizer on a two-lobe monopulse radar antenna employing a folded-tee as the microwave comparator to accomplish the unique results of producing a radar echo that can be processed by electronic circuits to provide azimuth and elevation target tracking.

These and other objects and the attendant advantages, features, and uses of this invention will become more apparent to those of ordinary skill in the art as the detailed description proceeds when considered along with the accompanying drawings, in which.

Figure 12:
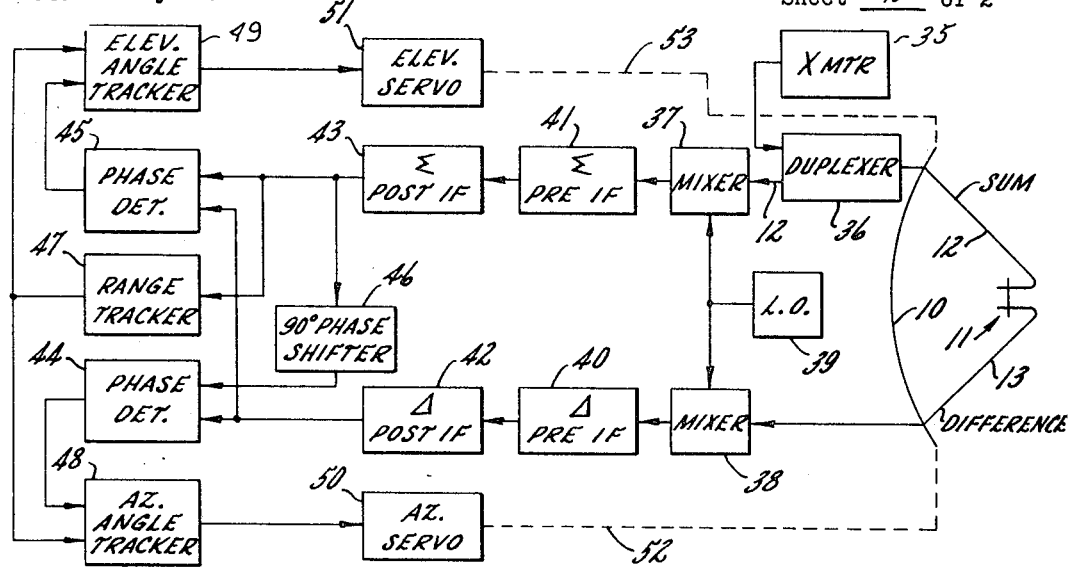
FIGURE 12 illustrates a block circuit diagram of a radar system utilizing the antenna feed of this invention to provide two-lobe monopulse for information in two axes.
Figure 13:
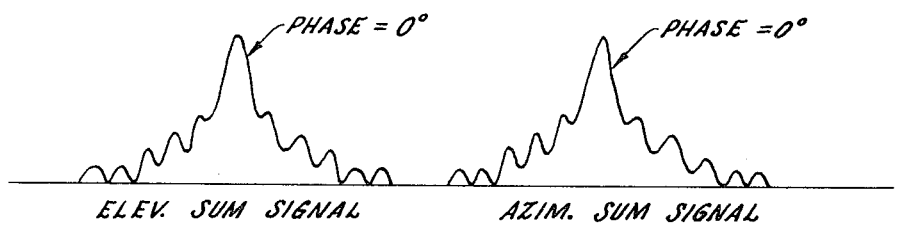
Figure 14:
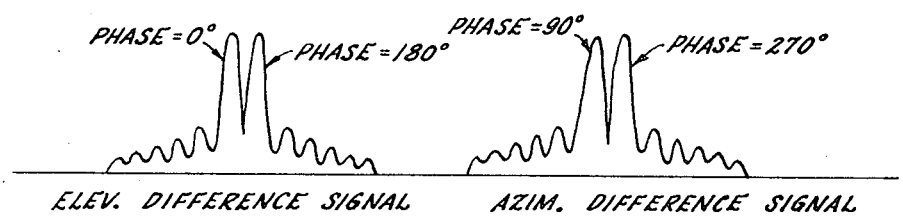

FIGURE 13 graphically illustrates the sum electromagnetic energy signal produced by the radar system of FIGURE 12; and FIGURE 14 graphically illustrates the difference electromagnetic energy signal produced by the system of FIGURE 12.

Figure 1:
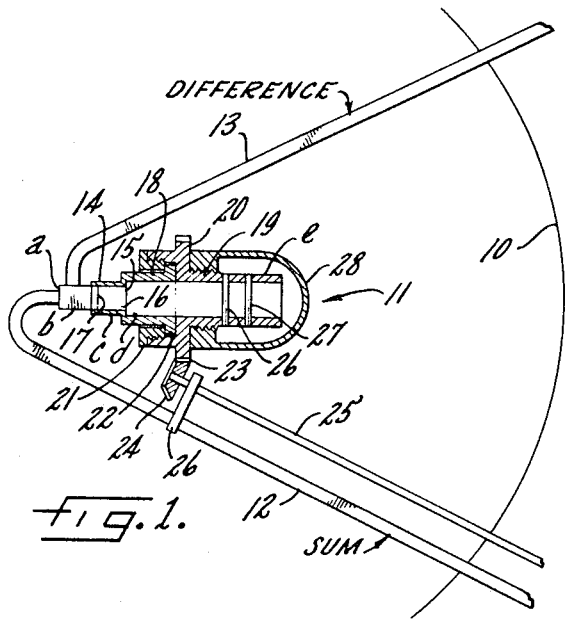
FIGURE 1 is a partially sectional and partially schematic drawing of the radar antenna feed of this invention.

Referring more particularly to FIGURE 1 of the drawings, an antenna reflector 10, of any well-known design for radar transmission and reception purposes, and preferably of the parabolic type, is illustrated as supporting an antenna feed 11 at the focal point thereof by waveguides 12 and 13. The waveguide 12 is a rectangular waveguide for conducting the sum electromagnetic energy to and from the antenna feed 11. The waveguide 13 is also a rectangular waveguide for conducting difference electromagnetic energy from the antenna feed 11. The sum and difference rectangular waveguides 12 and 13, respectively, are coupled to the sum and difference arms of a folded magic tee 14, the sum rectangular waveguide 12 being coupled in alignment at a with the sum input of the folded-tee 14 and the difference rectangular waveguide 13 being coupled into the top of the folded-tee 14 in the waveguide portion b, as will become clear in the description of FIGURE 2. Portion c of the folded-tee 14 comprises the folded arms of the normal magic tee to produce two waveguide passages 15 and 16 separated by the waveguide wall 17. The folded-tee with the two passages also functions as a signal comparator, as will later become clear in the description. The folded arms 15 and 16 of the folded-tee 14 are coupled to a circular matching waveguide section 18. Rotatably supported on the circular matching section 18 is a circular waveguide horn 19 of equal diameter with that of the matching 18 and in coaxial alignment with the matching section 18, the rotatable support being by a shoulder portion 20 internally threaded to receive a threaded collar 21 imprisoning a flange 22 on the circular waveguide matching section 18. The rotatable circular waveguide horn 19 has an annular gear 23 integral therewith, or supported thereon, to mesh with a pinion gear 24 on a shaft 25 that is supported by bracket 26 at the end near the pinion gear and by the antenna reflector 10 at its opposite end. Within the rotatable circular waveguide horn are two diametrically positioned susceptor rods 26 and 27 in fixed spacial relation ⅜ wavelength apart. The rotatable circular waveguide horn 19 constitutes the circularly polarizing means of linear polarized electromagnetic energy coming from the transmitter over the sum rectangular waveguide 12 through the folded-tee 14 to produce two-lobe monopulse transmitted radar energy propagated in a circular manner as set out by Equations 2 and 3. The rotatable cylindrical waveguide horn 19 is protected from weather by a threaded cap 28 which may be of plastic or of any other suitable material.

Figure 2:
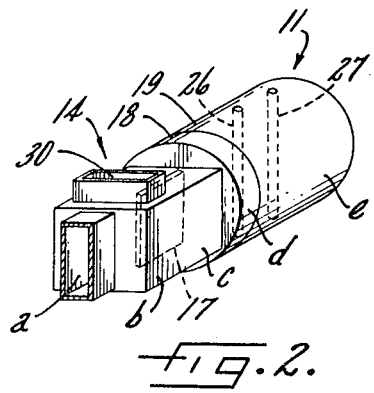
FIGURE 2 is an isometric view of a schematic illustration of the antenna feed.

Referring more particularly to FIGURE 2, there is an isometric illustration of the antenna feed 11 without the protective cover 28. The sum rectangular waveguide 12 is coupled to the input portion a of the folded-tee 14 while the difference rectangular waveguide 13 is coupled to the folded-tee at opening 30 in the top surface of the portion b. The folded arms 15 and 16 are formed within the portion c of the folded-tee 14 with the waveguide wall 17 separating these two folded waveguide arms. The folded arms of the c portion of the folded-tee 14 are coupled to the circular waveguide matching portion 18, or d section, to which is coupled the rotatable horn portion 19, or e section, of the waveguide. The susceptor pins 26 and 27 are shown in dotted lines within the cylindrical horn 19 of the antenna feed 11 in FIGURE 2. The use of a pair of susceptor rods or pins diametrically separated ⅜ wavelength apart to provide a circular polarizing means is more fully described in the prior-mentioned text of Principles and Applications of Waveguide Transmission by George Southworth, beginning on page 328, and will not be more fully described herein. It is to be realized that linearly polarized electromagnetic energy traveling through the waveguide horn 19 propagating at right angles or parallel to the susceptor rods will not produce any change in their wave propagation. If the susceptor rods are rotated at 45° with respect to the linear polarized propagated waves, or their electric vectors, it will cause circular polarization of the electromagnetic energy. If the susceptor rods 26 and 27 are rotated through the mechanism 20 through 25 clockwise, as viewed from the left in FIGURE 1, it will produce right circular polarization of the electromagnetic radiated energy, while rotation counterclockwise 45° of the susceptor rods 26, 27 will produce left circular polarized electromagnetic energy. Any rotation of the susceptor rods 26 and 27 clockwise or counterclockwise within the 45° limit of its vertical position will produce elliptically polarized electromagnetic energy, right or left, as the case may be. The susceptor rods have a diameter which gives a susceptance of −2 and the spacing of approximately ⅜ wavelength is chosen to give a good electrical match. The susceptor rods, as used in this invention, are of a susceptance of −2 although this susceptance should not in any way be limiting of the invention. The two rods with a susceptance of −2 will give 90° phase shift when the electric fields are parallel ot the rods, but when the rods are positioned 45° with respect to the electric vector, then circularly polarized electromagnetic waves will be transmitted down the waveguide. The transmitter is coupled to the sum rectangular waveguide 12, as will be more clearly described in the detailed description of FIGURE 12, to transmit linear, elliptical, or circular energy depending upon the exact orientation of the polarizing section 19. A detailed description of the generation of the circular polarized wave will be more fully described hereinbelow using the electric mode theory.

Figure 3:
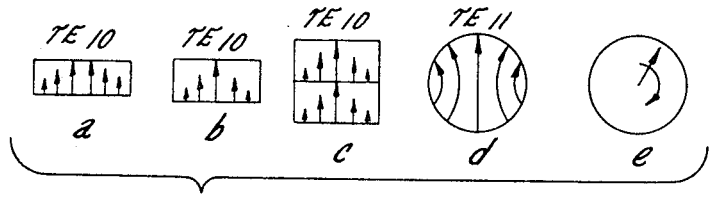
FIGURES 3a through 3e illustrate schematic cross-sections of various portions of the waveguide and feed corresponding with the portions a and e of FIGURE 1.

FIGURES 3a through 3e correspond to the waveguide portions a through e in FIGURE 1 in which the transmitted linearly polarized electromagnetic energy from the rectangular waveguide 12 is transmitted into the folded-tee 14 at the inlet a, as shown in FIGURE 3a.

This linearly polarized electromagnetic energy sets up electric vectors, as shown in FIGURE 3a, whose distribution is a cosine function across the large cross-sectional dimension of the waveguide. This electromagnetic energy is of the $TE_{10}$ mode which mode is continued through the portion b of the folded-tee and divided in the two arms 16 of the folded-tee, as shown by the portion c, FIGURE 3c. As the electromagnetic energy is conducted into the circular matching waveguide section 18, the electromagnetic energy sets up the $TE_{11}$ mode as shown in FIGURE 3d. A circularly polarized signal may be generated by setting the polarizing mechanism 19-25 such that the susceptor rods 26 and 27 are oriented 45° with respect to the electric vector of the $TE_{11}$ mode.

The electric vector of the circularly polarized wave, as it exists in the horn portion e of FIGURE 1, is shown in FIGURE 3e, and this same wave is emitted from the horn e. It is believed to be well understood that the waves emitted from the horn e will be reflected from the parabolic reflector 10 to shape the transmitted beam. The reciprocity principal may be applied to show how the circular polarized energy is received and contributes to the sum return. It should be noted that the electric vectors in FIGURE 3c are in phase and of equal amplitude and for this condition all the energy goes to the sum channel 12 and none to the difference channel 13.

Figures 4, 5, 6, 7:
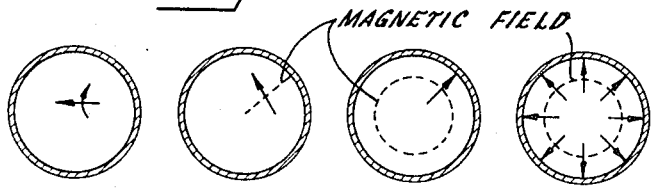
FIGURES 4 through 7 show cross-sectional illustrations of a circular waveguide with various illustrations of the electromagnetic energy electric vectors and magnetic fields established thereby.
Figure 8:
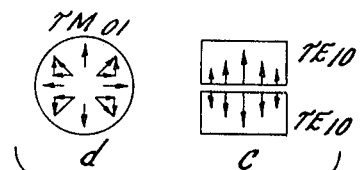
FIGURE 8 illustrates in the schematic configurations of FIGURES 8d and 8c the modes of echo electromagnetic energy in the portions so lettered in FIGURE 1.

FIGURES 4 through 7 show cross-sectional portions of circular waveguides to illustrate how the electric and magnetic fields are established and ultimately make up the difference signal. The rotating electric vector of a circularly polarized wave is shown in FIGURE 4. It should be noted that the vector does not rotate at the center of the waveguide. This phenomenon will be further described hereinbelow. FIGURE 5 shows the electric vector after it has rotated a few degrees. It is to be understood that magnetic fields are always set up perpendicular to the electric fields. In this figure the magnetic fields are interrupted by the waveguide wall. The magnetic field will be absorbed by the waveguide wall and no mode will be set up, consequently, no electromagnetic energy can propagate in the waveguide. Only when the electric vector is radial, as shown in FIGURE 6, can the magnetic fields exist. In this case the magnetic fields set up the electric fields shown in FIGURE 7 and this mode can be identified as the $TM_{01}$ mode. The $TM_{01}$ mode will propagate back through the feed assembly 11. The rods 26 and 27 will appear as discontinuities but will not upset the $TM_{01}$ mode. The same mode will exist in the round waveguide section 18. When this mode comes into the arms 15 and 16, the center wall 17 will divide the $TM_{01}$ mode, as shown in FIGURE 8d. Realizing the waveguide dimension is such that only the fundamental ($TE_{10}$) mode can be supported, then a careful look at the electric vectors at this point can show how this mode is generated. Each individual electric vector of FIGURE 8d can be divided into horizontal and vertical components. The horizontal components have a 180° phase relation and will all cancel. The vertical components have a cosine distribution across the broad dimension of the waveguide. This defines the $TE_{10}$ mode and it exists in both arms 15 and 16. It should be noted that the vectors in the lower arm are 180° out of phase with respect to those in the upper arm, as viewed in FIGURE 8c. For this condition all the energy will appear at the difference channel opening 30 and no energy will be present in the sum channel 12.

Figure 9:
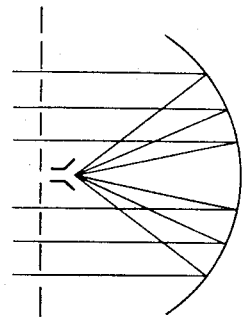
FIGURE 9 illustrates in schematic form the antenna feed and reflector where a reflecting object is on antenna boresight.
Figure 10:
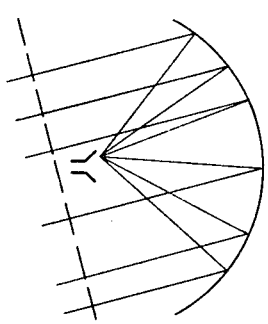
FIGURE 10 is an illustration similar to that of FIGURE 9 showing a situation where a target reflecting object is off antenna boresight.

The rotating electric vector of the circularly polarized wave is rotating about the center of the waveguide in FIGURE 3e. It should also be noted that the center of rotation is displaced in FIGURE 4. When the target is on boresight, the reflected energy forms a solid phase front across the aperture of the antenna, as illustrated in FIGURE 9. The parabolic antenna thus concentrates the energy at the focal point or at the center of the horn e. Under these conditions the electric vector of the circular polarized wave will rotate about the center of the horn e. If the target is not along the boresight axis of the antenna, then the phase front is skewed, as illustrated in FIGURE 10, and the returned energy is displaced from the focal point; therefore, the electric vectors will rotate off the center of the horn e, as shown in FIGURE 4. The greater the annular displacement of the target off antenna boresight, the greater the skewing of the phase front, the greater the radial component of the rotating vector, and the greater the difference signal. The limit is reached by the natural beamwidth of the antenna. Also, this is true regardless of the orientation of the target around the antenna boresight axis. The difference signal can be expressed mathematically in polar co-ordinates in the following:

$$E_D = P\theta = (ne)\theta \qquad (4)$$

where;

$E_D$ is the total difference signal
P is (ne)
n is the antenna constant
e is angle between antenna boresight and direct target
$\theta$ is orientation of target around antenna boresight.

There is a phase relationship between the sum signal, commonly called the reference signal, and the difference signal in any monopulse system, unless it is destroyed by poorly designed receivers, waveguide units, etc. The same phase relationship exists for this system, but in addition to this there is an additional phase variable which behaves in a manner shown by Equation 4. Therefore, if it is desirable, or so chosen, to track in the vertical (elevational) and horizontal (azimuthal) planes, then the difference signal must be measured in quadrature because the vertical axis is 90° (in quadrature) with the horizontal axis. From FIGURE 11 it can be seen that a simple mathematical process (conversion from polar to rectangular co-ordinates) will sample the difference signal in quadrature. The mathematical expressions may be written as:

Elevation Tracking Signal $= Y = (ne) \sin \theta \qquad (5)$

Azimuth Tracking Signal $= X = (ne) \cos \theta$
$= (ne)(\theta + 90) \qquad (6)$ A single axis tracker normally will sample one plane and quite frequently it is the elevation plane. To achieve tracking in the other plane it is necessary to add another phase detector and a 90° phase shift (see Equation 6). This will be described more fully as the description proceeds when the circuits of FIGURE 12 are described. It should be added that the phase detector and the phase shifter (at the intermediate frequency) are small, light, and simple circuits, but two axis tracking by conventional means would require either two radar sets or a heavy, complex, expensive four-lobe radar.

FIGURES 13 and 14 show the sum and difference signals, respectively, as measured in both the azimuth and elevation planes. They are compatible with the mathematical expressions in Equations 4, 5, and 6 which were used to explain the system theory.

Figure 11:
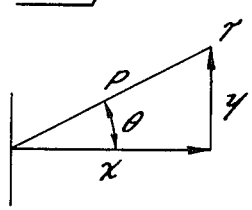
FIGURE 11 illustrates a polar and rectangular co-ordinate system illustrative of the target off antenna boresight.

Referring more particularly to FIGURE 12, a transmitter 35 is shown coupled through a duplexer 36 to the sum channel 12 to the antenna feed 11 and this sum channel, upon receiving echo energy back, will be coupled through the duplexer 36 to a mixer 37. Since the difference channel 13 is only operative upon receiving echo electromagnetic energy, it is coupled directly to a mixer 38 and the mixers 37 and 38 are coupled to a common local oscillator 39. The difference channel from the mixer 38 is coupled through a difference intermediate frequency (IF) preamplifier 40, a difference post IF amplifier 42, the output of which is coupled in common to two phase detectors 44 and 45. In like manner, the mixer output from the mixer 37 is coupled through a sum IF preamplifier 41 and a post IF amplifier 43 in common to the phase detectors 44 and 45, the coupling from the sum post IF amplifier 43 to the phase detector 44 being through a 90° phase shifter 46. The sum post IF amplifier 43 is also coupled to a range tracker circuit 47, the output of which is coupled as one input to an azimuth angle tracker 48 and as one input to an elevation angle tracker 49. The output of the phase detector 44 is coupled as a second input to the azimuth angle tracker 48 while the output of the phase detector 45 is coupled as a second input to the elevational angle tracker 49. The azimuth angle tracker 48 is coupled to control an azimuth servo motor 60 while the elevation angle tracker 49 is coupled to control an elevation servo motor 51. The azimuth and elevation servo motors 50 and 51 are mechanically coupled through mechanical means 52 and 53 to cause azimuthal and elevational direction control of the antenna 10, 11, as well understood by those skilled in the radar art. The folded-T 14 with transmitted linear polarized electromagnetic energy in the $TE_{10}$ mode produces a two-lobe monopulse radar when circular polarization of a $TM_{01}$ mode is used which will cause echo electromagnetic energy to be received back from target objects of different rotational electric vectors to produce both sum and difference signals of the target whenever the target is off boresight of the antenna. The target being off boresight of the antenna causes sampling of the radar of the X and Y co-ordinates as shown in FIGURE 11 producing two-axis information of a target in the same manner as a four-lobe monopulse radar system. Ordinarily a four-lobe monopulse system would require three or four IF channels to channel sum and difference signals for both axes of information while in this invention, as shown in FIGURE 12, only two IF channels are required, one for each sum and difference signal information, greatly reducing the equipment required yet obtaining four-lobe radar signal information from two-lobe transmission.

*Operation*

In the operation of this device let it be assumed that it is an airborne system and the polarizing means 20–25 in FIGURE 1 is adjusted to transmit linear polarized electromagnetic pulse energy. Echo pulses from target objects will be linearly polarized and received in the radar receiver to provide range and tracking in either azimuth or elevation according to the horizontal or vertical lobing of the transmitted signals. If the electromagnetic energy passes through precipitation, reflections will be echoed back to the receiver as clutter which is objectional to the radar operation. For example, if the transmitted lobing is in the vertical direction to obtain ground target tracking, only the phase detector 45 will have an output. The range tracker 47 provides the gate for a specific ground return object where there are a number of objects from which to select. Range gating of range trackers to select a specific target is controllable by operating personnel, as is well known in the radar ranging of selected targets. If precipitation is quite heavy, actual ground return may be obscured by precipitation clutter.

Let it be assumed that the polarizing means 20–25 is now activated to switch the antenna to transmit circular polarized electromagnetic energy for ground target tracking and to minimize the precipitation clutter given in the first example. Since precipitation echo electromagnetc energy will be rejected for the most part by virtue of this echo energy being reversed in the rotational polarized direction, ground returns will be clearly visible for radar ranging and tracking. The system will now be operated to provide tracking information in both the azimuthal and elevational axes for any discrete target in the air as well as those appearing on the ground.

Assuming the operation of this radar system to scan for targets in space, either elevational or azimuthal tracking of target objects could be obtained with the antenna switched for linearly polarized transmission and reception. This requires a new radar mount. In the absence of precipitation, target objects could be encountered in the manner normally used for such radar systems. With the radar antenna switched for circular polarization of transmitted electromagnetic energy, target objects will be tracked in both elevation and azimuth axes since the phase detectors will produce either positive or negative voltages for targets off boresight of the antenna. When one particular target is selected in range by proper range gating, the phase detectors 44 and 45 will develop voltage signals, positive or negative, in accordance with the degree that the target is right or left and up and down, respectively, from boresight of the antenna as the phase detection from the sum and difference signals takes place utilizing the sum intermediate frequency voltage as a reference. As the azimuth and elevation servo systems drive the antenna boresight axis toward the target, the difference voltage in the difference channel will approach zero. When the antenna is tracking the target on boresight, the difference voltage will be zero thus causing zero signal output from both elevation and azimuth angle trackers although a sum voltage exists in the sum channel. This is a condition, as seen in FIGURE 13, where the sum voltage is maximum and the difference voltage, as seen in FIGURE 14, is zero at the zero points of these graphic illustrations of the sum and difference antenna patterns.

Assuming in the last example of operation that precipitation was existent in the atmosphere, the circular polarized transmitted energy reflected by the water droplets would reverse the rotational sense of the energy, which reflected energy would be rejected by the antenna. Target object echo returns would be clear and distinct in the radar circuits for tracking in both azimuth and elevation axes.

While many modifications and changes may be made in the constructional details and features of this invention, it is to be understood that we desire to be limited in the spirit of our invention only by the scope of the appended claims.

We claim:

1. A two-axis tracking radar having a linearly-circularly polarized monopulse antenna feed comprising:
    a duplexer;
    a radar transmitter coupled to said duplexer;
    a radar receiver having a sum channel coupled to said duplexer and having a difference channel;
    sum and difference waveguides;
    a radar antenna having a reflector and having a feed supported at the illuminating point of said reflector by said sum and difference waveguides, said sum waveguide being coupled to said duplexer and said difference waveguide being coupled to said difference channel of said receiver;
    an electromagnetic energy comparator in said antenna feed having sum and difference ports coupled, respectively, to said sum and difference waveguides; and
    a circular polarizing means coupled to said comparator to transmit and to receive electromagnetic energy by reflection of said reflector whereby for circularly polarized transmitted electromagnetic energy the echo energy will return through said antenna feed and be compared in said comparator to provide sum and difference signals in said sum and difference channels of said receiver thereby providing azimuth and elevation tracking signals and clutter rejection of precipitation echoes.

2. A two-axis tracking radar having a switchable linearly-circularly polarized monopulse antenna feed comprising:
    a duplexer;
    a radar transmitter coupled to said duplexer;
    a phase detector and tracker circuits;
    a radar receiver having a sum channel coupled to said duplexer and having a difference channel, the output of said sum and difference channels being coupled to said phase detector and tracker circuits;

sum and difference waveguides; and a radar antenna having a reflector for scanning operation and having a feed supported at the illuminating point of said antenna reflector by said sum and difference waveguides fixed to said reflector, said sum waveguide being coupled to said duplexer and said difference waveguide being coupled to said difference channel of said receiver, said feed including an electromagnetic energy comparator with sum and difference ports coupled to said sum and difference waveguides and adjustable circular polarizer in conjunction therewith operative as an antenna feed horn whereby circularly polarized electromagnetic transmitted energy will produce circularly polarized echo signal energy which will be compared in said comparator to establish sum and difference signals in said sum and difference channels of said receiver to produce azimuth and elevation signals out of said phase detector and tracker circuits of an echoing object and whereby precipitation clutter will be rejected.

3. A two-axis tracking radar as set forth in claim 2 wherein
said tracker circuits include a servo motor and servo receiver coupling with said radar antenna to effect target object tracking, the reduction of errors in target tracking by aligning a target object with the boresight axis of said antenna being effective to reduce said difference signal.

4. A two-axis tracking radar as set forth in claim 3 wherein
said tracking circuits have a target range signal developed from said receiver sum channel as a reference in azimuth and elevation of the target object.

5. A two-axis tracking radar having a switchable linearly-circularly polarized monopulse antenna feed comprising:
a radar duplexer;
a radar transmitter coupled to said duplexer;
phase detector and azimuth and elevation tracker circuits, and a range tracker circuit;
a radar receiver having a sum channel coupled to said duplexer and having a difference channel, the output of said sum and difference channels being coupled to said phase detector and azimuth and elevation tracker circuits, said sum channel output also being coupled to said range tracker circuit with the output thereof being coupled to said azimuth and elevation tracker circuits;
sum and difference waveguides; and
a radar antenna coupled to said azimuth and elevation tracker circuits through servo means to cause said antenna to track a target illuminated by said antenna, said antenna having an antenna reflector and a feed supported at the illuminating point of said antenna reflector by said sum and difference waveguides fixed to said reflector with said sum waveguide being coupled to said duplexer and said difference waveguide being coupled to said difference channel of said receiver, said feed including a folded-tee with sum and difference ports coupled to said sum and difference waveguides and an adjustable circular polarizer in conjunction therewith operative as an antenna feed horn at the illuminating point of said antenna reflector whereby circularly polarized electromagnetic transmitted energy will be reflected from a target as circularly polarized energy with phase relations which will be compared in said folded-tee to establish sum and difference signals in said sum and difference channels of said receiver to produce azimuth and elevation signals out of said phase detectors to drive the tracker circuits and antenna in a direction to track the target object on the boresight axis thereby reducing the difference signal to zero, any precipitation reflections causing circular polarization in the opposite rotative direction from the transmitted energy being rejected by said antenna feed.

6. A two-axis tracking radar as set forth in claim 5 wherein
said sum and difference channels of said receiver each include a mixer and intermediate frequency amplifiers and a local oscillator connected to said mixers.

7. A two-axis tracking radar as set forth in claim 6 wherein
said intermediate frequency amplifiers of each sum and difference channel are cross coupled to each of two said phase detectors, one cross coupling including a ninety degree phase shifter.

8. A two axis radar system having a switchable linearly-circularly polarized monopulse antenna feed comprising:
a radar antenna reflector supported for scanning operation in azimuth and elevation by target tracking and servo means;
a waveguide folded-T having sum and difference rectangular waveguides coupled thereto, said waveguides supporting said folded-T on said antenna reflector;
a circular matching waveguide section coupled to the folded waveguide arms of the folded-T;
a rotatable circular waveguide section rotatably coupled to said circular matching waveguide section at the focal point of said antenna reflector, said rotatable circular waveguide section having two diametrically supported rods in the same diametrical plane and spaced ⅜ wavelength apart to transform linear polarized electromagnetic energy to circular polarized electromagnetic energy, and vice versa, upon transmission and reception, respectively, of said electromagnetic energy in accordance with the angular relation of said rods with said transmitted linearly polarized electric vectors;
a radar duplexer;
a radar transmitter coupled through said duplex to said sum rectangular waveguide for transmitting electromagnetic pulse energy;
a local oscillator;
a radar receiver having a first mixer coupled through said duplexer to said sum waveguide and having a second mixer coupled to said difference waveguide providing sum and difference channels, said first and second mixers being coupled to said local oscillator of said receiver and the mixed output of each mixer being coupled through intermediate frequency amplifiers of said receiver in said sum and difference channels to first and second phase sensitive detectors of said receivers, and said phase sensitive detectors being coupled to said target tracking and servo means of said antenna reflector to cause said antenna to track a target object on boresight in both the azimuthal and elevational directions; and
means mechanically coupled to said rotatable circular waveguide section to rotate same to change the angle of said rods with said electric vectors whereby transmitted energy can be switched from linear polarized electromagnetic energy to circular electromagnetic energy to produce echo linear and circular electromagnetic energy, respectively, from reflecting objects which circular polarized transmission will produce sum and difference echo signals to actuate said angle tracking and servo means to maintain the reflecting object on the boresight of the antenna in the azimuthal and elevational directions and which antenna will reject echo electromagnetic energy of opposite rotational sense with respect to the rotational sense of transmitted circular polarized energy to minimize precipitation reflections.

9. A monopulse radar system as set forth in claim 8 wherein said coupling of said first and second phase sensitive detectors with said target tracking and servo means includes target tracking means consisting of a range tracker, an elevation angle tracker, and an azimuth angle tracker with the coupling from said sum channel being cross coupled to said first and second phase sensitive detectors and to said range tracker, the output of said range tracker being in common to said elevation and azimuth angle trackers, and with the coupling from said difference channel being cross coupled to said first and second phase detectors with the output of said first phase detector being coupled to said elevation angle tracker and with the output of said second phase detector being coupled to said azimuth angle tracker.

10. A monopulse radar system as set forth in claim 9 wherein said cross couplings of one of said channels to said first and second phase detectors has a ninety degree phase shifter therein.

11. A switchable linearly-circularly polarized monopulse radar antenna comprising:

an antenna reflector;
sum and difference waveguides;
an electromagnetic energy comparator supported on said antenna reflector by said sum and difference waveguides constituting a two-lobe antenna feed; and
a circular polarizer coupled to said comparator to be positioned at the proper illuminating point of said antenna reflector to convert linear polarized electromagnetic energy to circular polarized electromagnetic energy for transmission into space and to receive the reflected electromagnetic energy through said circular polarizer and said comparator for reception in said sum and difference rectangular waveguides providing azimuth and elevation tracking signals similar to four-lobe type of radar operation and providing rejection of precipitation reflections.

12. A switchable linearly-circularly polarized monopulse radar antenna comprising:

an antenna reflector;
sum and difference rectangular waveguides;
an electromagnetic energy comparator supported on said antenna reflector by said sum and difference rectangular waveguides constituting a two-lobe antenna feed of electromagnetic energy in the $TE_{10}$ mode;
a matching circular waveguide section coupled to said comparator to transform transmitted electromagnetic energy from the sum rectangular waveguide in the $TE_{10}$ mode to the $TE_{11}$ mode; and
a circular polarizer coupled to the matching circular waveguide section to selectively convert the transmitted electromagnetic energy of the $TE_{11}$ mode to circular polarized energy for transmission into space by reflection from said reflector and for receiving echo electromagnetic energy of the $TM_{01}$ mode producing energy of the $TE_{10}$ mode in said comparator for conduction in the sum and difference rectangular waveguides producing azimuth and elevation signals of the echoing objects characteristic of a four-lobe antenna, the echo electromagnetic energy circularly polarized in an opposite rotative direction from the transmitted circularly polarized electromagnetic energy being rejected.

13. A switchable linearly-circularly polarized monopulse radar antenna feed comprising:

a radar antenna reflector;
sum and difference rectangular waveguides;
a folded-tee comparator having a circular waveguide section and having sum and difference rectangular waveguides coupled thereto and supporting said folded-tee comparator to said reflector, said folded-tee comparator having the folded arms of the tee matched to said circular waveguide section;
a rotatable circular waveguide section rotatably coupled to said circular waveguide section on said folded-tee comparator, said rotatable circular waveguide section having two diametrically supported rods therein in ⅜ wavelength spaced relation to produce circular polarization of electromagnetic energy, right and left, upon rotation of said rotatable circular waveguide section placing said rods in angular relation right and left, respectively, of the electric vectors of the electromagnetic energy in said circular waveguide section; and
means to rotate said rotatable circular waveguide section from a remote point whereby monopulse electromagnetic energy may be transmitted and received as linearly and circularly polarized waves in which circularly polarized received energy will produce sum and difference signals in said sum and difference waveguides for both elevation and azimuth information of a target and in which circular polarized echo signals of opposite rotative sense with respect to the transmitted signals will be rejected.

14. A switchable linearly-circularly polarized monopulse radar antenna feed as set forth in claim 13 wherein said means to rotate said rotatable circular waveguide section consists of an annular gear on said section in mesh with a pinoinogear on a shaft adapted to be connected remotely to a reversible control to adjust same.

15. A switchable linearly-circularly polarized monopulse radar antenna feed as set forth in claim 14 wherein said diametrically supported rods are inductive rods with a susceptance of —2.

16. A switchable linearly-circularly polarized monopulse radar antenna feed comprising:

a radar antenna reflector supported for scanning operation;
sum and difference rectangular waveguides;
a folded-tee having said sum and difference rectangular waveguides coupled thereto and supporting said folded-tee to said reflector;
a circular matching waveguide section coupled to the folded-tee arms;
a rotatable circular waveguide section rotatably coupled to said circular matching waveguide section, said rotatable circular waveguide section having two diametrically supported rods in the same diametrical plane and spaced ⅜ wavelength apart to produce elliptical and circular polarization of microwave energy, right and left, upon rotation of said rotatable circular waveguide section placing said rods in angular relation right and left, respectively, of the electric vectors of the electromagnetic energy; and
means mechanically coupled to said rotatable circular waveguide to rotate said circular waveguide section from a remote position whereby transmitted energy can be switched from linear polarized energy to circular polarized energy and to any elliptical pattern therebetween to produce both azimuthal and elevational information of a target and to reject reflected energy from objects producing circular polarization in the opposite rotative sense with respect to the transmitted energy.

17. A switchable linearly-circularly polarized monopulse radar antenna feed as set forth in claim 16 wherein said means mechanically coupled to said rotatable circular waveguide consists of an annular gear on the periphery of said rotatable circular waveguide in mesh with a pinion gear on a shaft extending to a remote point whereby the rotation of said shaft can adjust the angular position of said two rods with respect to the electric vectors of the transmitted energy to switch said transmitted energy from linear polarization to circular polarization.

18. A switchable linearly-circularly polarized monopulse radar antenna feed as set forth in claim 17 wherein said sum rectangular waveguide includes a duplexer in circuit therewith through which radar transmitter energy is coupled to said sum rectangular waveguide and said received radar energy is through said sum and difference rectangular waveguides.

References Cited
UNITED STATES PATENTS

| | | | |
|---|---|---|---|
| 2,845,622 | 7/1958 | Gamble | 343—7.4 |
| 2,965,898 | 12/1960 | Lewis | 343—16 |
| 3,201,715 | 8/1965 | Breese | 333—11 |
| 3,215,957 | 11/1965 | Dantzig et al. | 333—21 |

RICHARD A. FARLEY, *Primary Examiner.*

T. H. TUBBESING, *Assistant Examiner.*

U.S. Cl. X.R.

333—11, 21; 343—16, 100, 756, 783